(12) United States Patent
Kean et al.

(10) Patent No.: US 9,774,802 B2
(45) Date of Patent: Sep. 26, 2017

(54) METHOD AND APPARATUS FOR INCREASING PIXEL SENSITIVITY AND DYNAMIC RANGE

(71) Applicant: RAYTHEON COMPANY, Waltham, MA (US)

(72) Inventors: Bryan W. Kean, Fairfax, VA (US); John L. Vampola, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 383 days.

(21) Appl. No.: 14/536,733

(22) Filed: Nov. 10, 2014

(65) Prior Publication Data

US 2016/0134820 A1    May 12, 2016

(51) Int. Cl.
*H04N 5/355* (2011.01)
*H04N 5/3745* (2011.01)

(52) U.S. Cl.
CPC ......... *H04N 5/3559* (2013.01); *H04N 5/3745* (2013.01); *H04N 5/37452* (2013.01)

(58) Field of Classification Search
CPC ............ H04N 5/3559; H04N 5/37452; H04N 5/3745; H04N 5/355; H04N 5/374; H04N 5/35527; H04N 5/35509; H01L 27/146; H01L 27/14609; H01L 27/14612; H01L 27/14643

See application file for complete search history.

(56) References Cited

U.S. PATENT DOCUMENTS

| | | | | |
|---|---|---|---|---|
| 6,246,436 | B1* | 6/2001 | Lin | G01J 1/46 257/E27.132 |
| 6,512,544 | B1* | 1/2003 | Merrill | H01L 27/1443 250/208.1 |
| 7,745,776 | B2* | 6/2010 | Wada | H04N 5/235 250/208.1 |
| 8,294,077 | B2* | 10/2012 | Mao | H04N 5/35509 250/208.1 |
| 8,426,796 | B2* | 4/2013 | Mao | H04N 5/35509 250/208.1 |

(Continued)

FOREIGN PATENT DOCUMENTS

| | | |
|---|---|---|
| EP | 1732134 A1 | 12/2006 |
| EP | 2180528 A1 | 4/2010 |
| WO | 99/66560 A1 | 12/1999 |

*Primary Examiner* — John Lee
(74) *Attorney, Agent, or Firm* — Lando & Anastasi, LLP

(57) ABSTRACT

According to one aspect, embodiments herein provide a unit cell comprising a photodiode, a MOSCap having an input node coupled to the photodiode, a reset switch selectively coupled between the MOSCap and a reset voltage, and a transistor coupled to the input node of the MOSCap, wherein, in a first mode of operation of the unit cell, the reset switch is configured in an open state and charge generated by light incident on the photodiode accumulates at the input node of the MOSCap in response to voltage at the input node being less than a threshold voltage, and wherein, in a second mode of operation of the unit cell, the reset switch is configured in the open state and the charge generated by the light incident on the photodiode accumulates on the MOSCap in response to the voltage at the input node being greater than the threshold voltage.

20 Claims, 2 Drawing Sheets

(56) References Cited

U.S. PATENT DOCUMENTS

| | | | |
|---|---|---|---|
| 8,471,940 B2* | 6/2013 | Sa | H04N 5/35527 348/229.1 |
| 9,191,588 B2* | 11/2015 | Collins | H04N 5/3535 |
| 9,407,795 B2* | 8/2016 | Maes | H04N 3/155 |
| 2007/0131991 A1* | 6/2007 | Sugawa | H01L 27/14603 257/292 |
| 2008/0007640 A1 | 1/2008 | Fuchikami et al. | |
| 2009/0140305 A1* | 6/2009 | Sugawa | H01L 27/14603 257/292 |
| 2009/0225210 A1* | 9/2009 | Sugawa | H01L 27/14603 348/308 |
| 2010/0140452 A1 | 6/2010 | Vampola et al. | |
| 2011/0175871 A1* | 7/2011 | Katoh | G02F 1/13338 345/207 |
| 2012/0153123 A1* | 6/2012 | Mao | H04N 5/35509 250/208.1 |
| 2012/0262616 A1* | 10/2012 | Sa | H04N 5/3745 348/311 |
| 2012/0280112 A1* | 11/2012 | Collins | H04N 5/3535 250/208.1 |
| 2012/0313197 A1 | 12/2012 | Chen et al. | |
| 2013/0009043 A1* | 1/2013 | Mao | H04N 5/35509 250/208.1 |
| 2014/0252239 A1* | 9/2014 | Nguyen | H04N 5/32 250/366 |
| 2016/0134820 A1* | 5/2016 | Kean | H04N 5/37452 250/208.1 |

* cited by examiner

METHOD AND APPARATUS FOR INCREASING PIXEL SENSITIVITY AND DYNAMIC RANGE

BACKGROUND

Image sensors used in image capture devices generally generate charge in proportion to light intensity received at the image sensor from a scene viewed by the image sensor. Low ambient light scenes require an image sensor to have components with low noise and low capacitance in order to provide high sensitivity. Alternatively, a bright ambient light scene requires an image sensor to have components with higher capacitance in order to store the generated charge. These competing capacitance requirements have led to the development of image capture devices typically being optimized for either a bright ambient light scene or a low ambient light scene.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

SUMMARY OF INVENTION

Figure 1:
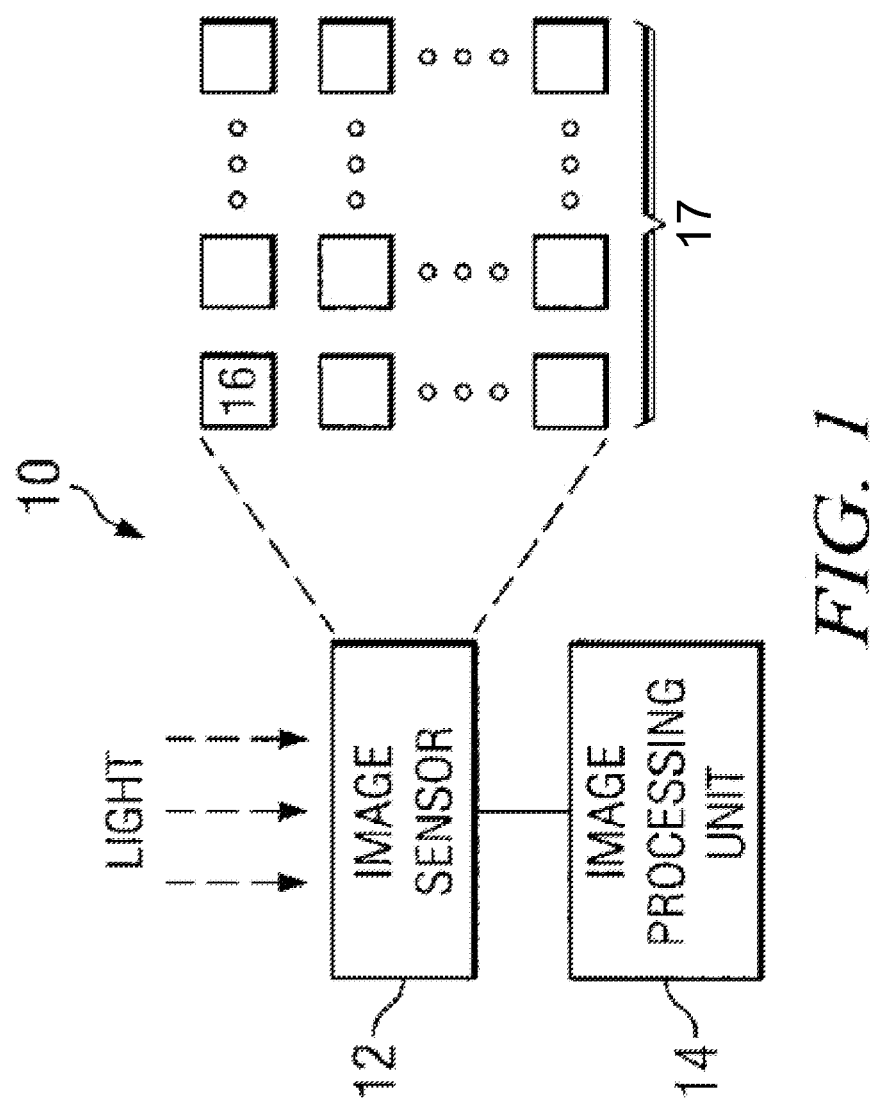
FIG. 1 is a block diagram illustrating an image capture device according to aspects of the invention.

Aspects and embodiments are directed to a high dynamic range unit cell with a smaller pixel size (e.g., such as 4 microns and below) than standard hybrid unit cells. The high dynamic range unit cell is provided by utilizing components in the unit cell for multiple functions. For example, a Metal-Oxide-Semiconductor Capacitor (MOSCap) is simultaneously used as a high-sensitivity anti-blooming gate as well as a low-sensitivity capacitor for increased well-capacity. By utilizing a MOSCap as both a storage capacitor and an anti-blooming gate (i.e., in both low and high ambient light situations), one of the anti-bloom switches from a standard hybrid unit cell can be removed, thereby allowing the size of the unit cell to be reduced while still providing accurate light intensity related signals in both low and high ambient light situations.

At least one aspect described herein is directed to a unit cell comprising a photodiode configured to be coupled to a supply voltage, a MOSCap having an input node coupled to the photodiode, a reset switch selectively coupled between the MOSCap and a reset voltage, and a transistor coupled to the input node of the MOSCap, wherein, in a first mode of operation of the unit cell, the reset switch is configured in an open state and charge generated by light incident on the photodiode accumulates at the input node of the MOSCap in response to voltage at the input node being less than a threshold voltage, and wherein, in a second mode of operation of the unit cell, the reset switch is configured in the open state and the charge generated by the light incident on the photodiode accumulates on the MOSCap in response to the voltage at the input node being greater than the threshold voltage.

According to one embodiment, the unit cell further comprises an output, and an output switch selectively coupled between the transistor and the output, wherein, in a third mode of operation of the unit cell, the output switch is configured to couple the output to the transistor, the reset switch is configured in the open state, and a high sensitivity signal corresponding to the charge accumulated at the input node of the MOSCap is provided to the output. In another embodiment, in a fourth mode of operation of the unit cell, the output switch is configured to couple the output to the transistor, the reset switch is configured in the open state, and a low sensitivity signal corresponding to the charge accumulated on the MOSCap is provided to the output.

According to another embodiment, the unit cell further comprises a MOSCap gate bias control module coupled to the MOSCap and configured to provide a MOSCap gate bias voltage signal to the MOSCap to control a level of the threshold voltage. In one embodiment, the reset switch is a transistor. In another embodiment, the unit cell further comprises a reset switch gate bias control module coupled to the reset switch and configured to provide a reset switch gate bias voltage signal to the reset switch to control an operational state of the reset switch. In one embodiment, in a fifth mode of operation of the unit cell, the reset switch is configured to couple the MOSCap to the reset voltage and the charge accumulated on the MOSCap is discharged.

Another aspect described herein is directed to a method for operating a unit cell comprising a photodiode, a MOSCap having an input node coupled to the photodiode, a reset switch selectively coupled between the MOSCap and a reset voltage, a transistor coupled to the input node, and an output switch selectively coupled between the transistor and an output, the method comprising configuring the reset switch to an open state for a first and a second mode of operation of the unit cell, configuring the output switch to an open state for the first and the second modes of operation, generating charge in response to light incident on the photodiode, storing, in the first mode of operation in response to voltage at the input node being less than a threshold voltage, the charge at the input node of the MOSCap, and storing, in the second mode of operation in response to the voltage at the input node being greater than the threshold voltage, the charge on the MOSCap.

According to one embodiment, the method further comprises configuring the reset switch to the open state for a third mode of operation of the unit cell, coupling the output to the transistor with the output switch for the third mode of operation, and reading out, in the third mode of operation, the charge stored at the input node of the MOSCap from the output as a high sensitivity signal. In another embodiment, the method further comprises configuring the reset switch to the open state for a fourth mode of operation of the unit cell, coupling the output to the transistor with the output switch for the fourth mode of operation, and reading out, in the fourth mode of operation, the charge stored on the MOSCap from the output as a low sensitivity signal.

According to another embodiment, the method further comprises determining which one of the low sensitivity signal and the high sensitivity signal accurately represents an intensity of the light incident on the photodiode, and utilizing the one of the low sensitivity signal and the high sensitivity signal to generate a pixel of an image.

According to one embodiment, determining comprises comparing the high sensitivity signal to a high sensitivity signal threshold, identifying the high sensitivity signal as an accurate representation of the intensity of the light incident on the photodiode in response to a determination that the high sensitivity signal is less than the high sensitivity signal threshold, and identifying the low sensitivity signal as an accurate representation of the intensity of the light incident on the photodiode in response to a determination that the high sensitivity signal is greater than the high sensitivity signal threshold. In another embodiment, determining comprises recording a plurality of the high sensitivity signals over a period of time, generating a high sensitivity signal curve based on the plurality of the high sensitivity signals, analyzing a slope of the high sensitivity signal curve, identifying the high sensitivity signal as an accurate representation of the intensity of the light incident on the photodiode in response to a determination that the high sensitivity signal curve is linear, and identifying the low sensitivity signal as an accurate representation of the intensity of the light incident on the photodiode in response to a determination that the high sensitivity signal curve is non-linear.

According to another embodiment, the method further comprises coupling the MOSCap to the reset voltage with the reset switch for a fifth mode of operation of the unit cell, and discharging, in the fifth mode of operation, the charge stored on the MOSCap. In one embodiment, the method further comprises providing a MOSCap gate bias voltage signal to the MOSCap to control a level of the threshold voltage.

One aspect described herein is directed to an image sensor comprising an image processing unit, and a plurality of unit cells coupled to the image processing unit and configured in an array, each unit cell comprising a photodiode coupled to a supply voltage, a MOSCap having an input node coupled to the photodiode, a reset switch selectively coupled between the MOSCap and a reset voltage, and a transistor coupled to the input node of the MOSCap, wherein, in a first mode of operation of each unit cell, the reset switch is configured in an open state and charge generated by light incident on the photodiode accumulates at the input node of the MOSCap in response to voltage at the input node being less than a threshold voltage, and wherein, in a second mode of operation of each unit cell, the reset switch is configured in the open state and the charge generated by the light incident on the photodiode accumulates on the MOSCap in response to the voltage at the input node being greater than the threshold voltage.

According to one embodiment, each unit cell further comprises a MOSCap gate bias control module coupled to the MOSCap and configured to provide a MOSCap gate bias voltage signal to the MOSCap to control a level of the threshold voltage, and a reset switch gate bias control module coupled to the reset switch and configured to provide a reset switch gate bias voltage signal to the reset switch to control an operational state of the reset switch. In one embodiment, the image sensor further comprises an external clock coupled to at least one of the reset switch gate bias control modules.

According to another embodiment, each unit cell further comprises an output coupled to the image processing unit, and an output switch selectively coupled between the transistor and the output, wherein, in a third mode of operation of each unit cell, the output switch is configured to couple the output to the transistor, the reset switch is configured in the open state, and the image processing unit is configured to read out the charge accumulated at the input node of the MOSCap from the output as a high sensitivity signal, wherein in a fourth mode of operation of each unit cell, the output switch is configured to couple the output to the transistor, the reset switch is configured in the open state, and the image processing unit is configured to read out the charge accumulated on the MOSCap from the output as a low sensitivity signal, and wherein in a fifth mode of operation of each unit cell, the reset switch is configured to couple the MOSCap to the reset voltage and the charge accumulated on the MOSCap is discharged.

According to one embodiment, the image processing unit is configured to receive the high sensitivity signal and the low sensitivity signal from each unit cell, to determine which one of the low sensitivity signal and the high sensitivity signal from each unit cell accurately represents an intensity of the light incident on the photodiode, and to generate an image based on the one of the low sensitivity signal and high sensitivity signal from each unit cell.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

DETAILED DESCRIPTION

There are many different types of image capturing devices such as digital cameras, video cameras, or other photographic and/or image capturing equipment. These image capturing devices may use image sensors, such as Active Pixel Sensors (APS) or other suitable light sensing devices, to capture images from a desired scene. For example, an APS may be composed of a unit cell array that receives light via a lens. The light causes each unit cell to accumulate an electric charge proportional to the light intensity at that location. Each unit cell in the array typically includes circuitry such as a photo-diode, a capacitor and other components.

Each unit cell in an array generally corresponds to a picture element, or pixel, in the final image of the desired scene. A pixel is considered the smallest portion of a digital image. A digital image is generally made up of an array of pixels. Circuitry coupled to the image capturing device may perform post light capture processing steps to convert the accumulated charges from each unit cell into pixel information. This information may include the color, saturation, brightness, or other information that a digital image storage format may require. Digital images may be stored in formats such as .JPG, .GIF, .TIFF, or any other suitable format.

As discussed above, typical image capture devices are generally optimized for either a bright ambient light scene (i.e., a low sensitivity situation) or a low ambient light scene (i.e., a high sensitivity situation). In a low ambient light situation, such as with shadows, pictures taken at night, pictures taken indoors, or other situations where there is a relatively low amount of ambient light, an image capture device generally requires a higher sensitivity to differentiate different levels of electric charge accumulated in its unit cells. In high sensitivity devices, parasitic capacitance (i.e., the capacitance that exists between parts of a circuit) should be minimized as small changes in the units of charge of the circuit may correspond to different levels in a final image. For example, in a high sensitivity device, an additional five units of charge could result in a different level of brightness in the final image, whereas in a low sensitivity device, an additional 50 units of charge would result in a different level of brightness in the final image. Accordingly, if an image capture device having a high parasitic capacitance is exposed to a low ambient light scene, the accumulated charge in the image capture device may not proportionally (or accurately) reflect the light intensity of the scene, which may ultimately lead to errors in the final image.

A bright ambient light situation, such as a sunny day, a well-lit room, or other situations where there is a relatively large amount of ambient light, may present a different problem. In a bright ambient light situation, a much larger amount of charge accumulates in an image capture device due to the greater intensity of light captured by the image capture device. This larger amount of charge generally requires the addition of a capacitor to store the accumulated charge generated at the image sensor. Typically, the influence of a parasitic capacitor can be taken into account when designing the above-mentioned capacitor to ensure that a sufficient amount of charge can be held in a pixel. Thus, an image capture device that is optimized for a bright ambient light situation would not perform optimally in a low ambient light situation due to the difference in accumulated charge and capacitance requirements for the two situations (i.e., the low and bright ambient light situations).

One prior attempt to address the different requirements of low and bright ambient light situations has been to include both a low sensitivity path and a high sensitivity path in a hybrid unit cell. For example, in a typical dual-path hybrid unit cell, a low sensitivity path is utilized for a high ambient light situation and a separate high sensitivity path is utilized for a low ambient light situation. However, in a dual-path hybrid unit cell, multiple anti-bloom switches (i.e., at least one for each path) are generally used. By utilizing multiple anti-bloom switches, the pixel size of such a dual-path hybrid unit cell cannot typically be reduced below 5 microns.

Accordingly, aspects and embodiments are directed to a system and method for providing a high dynamic range unit cell with a smaller pixel size (e.g., such as 4 microns and below). The high dynamic range unit cell is provided by utilizing components in the unit cell for multiple functions. For example, a Metal-Oxide-Semiconductor Capacitor (MOSCap) is simultaneously used as a high-sensitivity anti-blooming gate as well as a low-sensitivity capacitor for increased well-capacity. By utilizing a MOSCAP as both a capacitor and an anti-blooming gate (i.e., in both low and high ambient light situations), one of the anti-bloom switches from a standard dual-path hybrid unit cell discussed above can be removed, thereby allowing the size of the unit cell to be reduced while still providing high dynamic range.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram illustrating an image capture device 10 that may be used to capture images. For example device 10 may be a digital camera, video camera, or other photographic and/or image capturing equipment. Image capture device 10 comprises image sensor 12 and image processing unit 14. Image sensor 12 may be an APS or other suitable light sensing device that can capture images. Image processing unit 14 may be a combination of hardware, software, and/or firmware that is operable to receive signal information from image sensor 12 and convert the signal information into a digital image.

Image sensor 12 includes an array 17 of unit cells 16. Each unit cell 16 accumulates charge proportional to the light intensity at that location in the field of view. Each unit cell 16 may correspond to a pixel in the captured electronic image. Unit cell 16 may temporarily store the accumulated charge for use by processing unit 14 to create an image. The stored charge, for example, may be converted into a voltage and the value of the voltage may be sampled by processing unit 14 in order to digitize and store the value into some form of memory.

A particular method for image capture using image capture device 10 may be ripple capture. Ripple capture is a method that captures each row of pixels from image sensor 12 in order. For example, ripple capture may expose the top row of pixels of image sensor 12 to light, followed by the second row, followed by the third row, and so forth until the last row of pixels of image sensor 12 is exposed to light. Another particular method for image processing unit 14 to receive pixel information captured by image sensor 12 may be ripple read. Ripple read is a method that processes each row of pixels from image sensor 12 in order. Similar to ripple capture, ripple read may process the top row of pixels of image sensor 12, followed by the second row, followed by the third row, and so forth until the last row of pixels of image sensor 12 is processed. A ripple reset operation to reset the rows of pixels of image sensor 12 may be performed similarly.

These methods may be performed on consecutive rows. For example, a ripple capture operation may begin with the first row of image sensor 12. As the ripple capture operation moves to the second row, a ripple read operation may begin on the first row of image sensor 12. After the ripple capture operation moves to the third row, the ripple read operation may begin on the second row and a ripple reset operation may begin on the first row. This may continue until the last row is processed. Once the last row is processed, the image may be processed and stored by processing unit 14.

Figure 2:
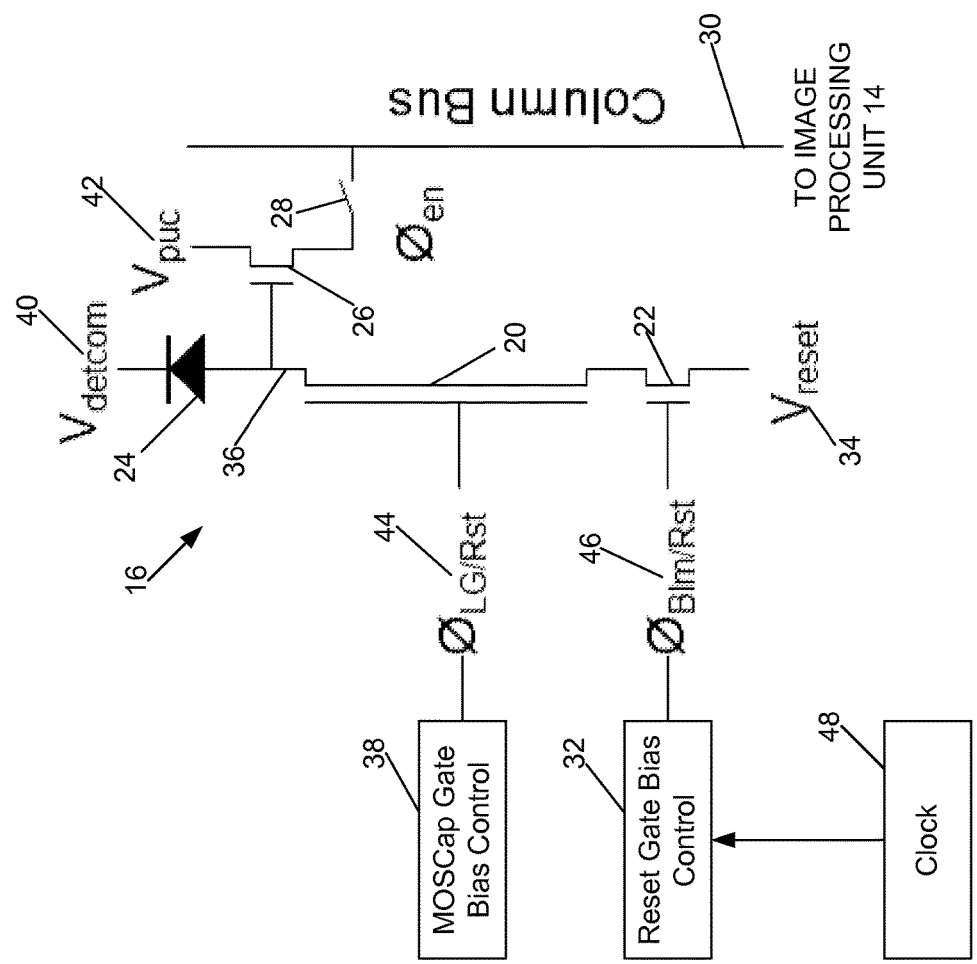
FIG. 2 is a circuit diagram of a high dynamic range unit cell according to aspects of the invention.

FIG. 2 is a circuit diagram of one example of a high dynamic range unit cell 16 that may be included in the image sensor 12 and coupled to the image processing unit 14. The high dynamic range unit cell 16 includes a MOSCap 20, a reset switch 22, a photodiode 24, a buffer transistor 26, an output switch 28, and a column bus 30. According to one embodiment, the MOSCap 20 is a P-channel Metal-Oxide Semiconductor (PMOS) capacitor; however, in other embodiments, another type of MOSCap may be utilized. According to one embodiment, the reset switch 22 is a PMOS Field Effect Transistors (FET); however, in other embodiments, the reset switch 22 may be any other appropriate type of switch or transistor. According to one embodiment, the buffer transistor 26 is a PMOS FET; however, in other embodiments, the transistor may be any other appropriate type of transistor. The output switch 28 may be any appropriate type of mechanical or transistor-based switch.

The reset switch 22 is coupled between a voltage source providing a reset voltage ($V_{reset}$) 34 and the MOSCap 20. The gate of the reset switch 22 is coupled to a reset gate bias control module 32. The MOSCap 20 is coupled between the reset switch 22 and the photodiode 24. The gate of the MOSCap 20 is coupled to a MOSCap gate bias control module 38. A source/drain node 36 of the MOSCap 20 is coupled to the anode of the photodiode 24 and to the gate of the buffer transistor 26. The cathode of the photodiode 24 is coupled to a voltage source providing a supply voltage ($V_{detcom}$) 40. The buffer transistor 26 is coupled between a voltage source providing a supply voltage ($V_{puc}$) 42 and a first terminal of the output switch 28. A second terminal of the output switch 28 is coupled to the column bus 30. The column bus 30 is configured to be coupled to the image processing unit 14.

The unit cell 16 is configured to have a relatively small pixel size (e.g., such as 4 microns and below). The relatively small size of the unit cell 16 is provided by utilizing the MOSCap 20 for multiple functions. For example, the MOSCap 20 is simultaneously used as a high-sensitivity anti-blooming gate as well as a low-sensitivity capacitor for increased well-capacity. For example, as light from a scene is incident on the photodiode 24, charge accumulates at the source/drain node 36. As discussed above, the amount of charge accumulated at the source/drain node 36 is indicative of the intensity of the light incident on the photodiode 24.

In a low ambient light situation, the intensity of the light incident on the photodiode 24 is relatively low and consequently the amount of charge accumulated at the source/drain node 36 is also relatively low. Thus, a smaller capacitance is required to store the generated charge in the low ambient light situation. The inherent capacitance of components coupled to the source/drain node 36 is sufficient to provide storage of the charge generated at the source/drain node 36 in the low ambient light situation. Also, as discussed above, in a low ambient light situation, it is desirable to minimize the parasitic capacitance of a unit cell. Accordingly, by minimizing the width of the source/drain on MOSCap 20, the input capacitance and the loading of the source/drain node 36 may be minimized in a low ambient light situation. In addition, by locating the reset switch 22 in series with the MOSCap 20 and on the side of the MOSCap 20 opposite the photodiode 24, rather than in parallel with the MOSCap 20, the reset switch 22 is prevented from loading down the source/drain node 36 and reducing the gain (i.e., increasing the noise) at the source/drain node 36.

In a high ambient light situation, the intensity of the light incident on the photodiode 24 is relatively high and consequently the amount of charge generated in response to the high intensity light is also relatively high. The inherent capacitance of components coupled to the source/drain node 36 is insufficient to provide storage of the charge generated at the source/drain node 36 in the high ambient light situation. Thus, in a high ambient light situation, a larger capacitance is required to store the generated charge. Absent such a larger capacitance, the charge generated at the source/drain node 36 in a high ambient light situation would result in saturation and/or blooming of the unit cell 16. Accordingly, in a high ambient light situation, the MOSCap 20 is operated to prevent saturation and blooming in the unit cell 16 and also to store charge generated by the high intensity light incident on the photodiode 24.

The MOSCap gate bias control module 38 provides a gate bias voltage signal ($Ø_{LG/Rst}$) 44 to the gate of the MOSCap 20. The capacitance of the MOSCap 20 depends on the voltage across the MOSCap 20 (i.e., the voltage between the source/drain node 36 and the gate of the MOSCap 20). As discussed above, in a high ambient light situation, charge accumulates (i.e., and voltage increases) at the source/drain node 36. Once the voltage across the MOSCap 20 exceeds an inversion mode threshold voltage ($V_T$), the MOSCap 20 enters an inversion mode where the capacitance of the MOSCap 20 increases and charge begins to accumulate on the MOSCap 20. Accordingly, by controlling the gate bias voltage signal ($Ø_{LG/Rst}$) 44 provided to the gate of the MOSCap 20, the capacitance of the MOSCap 20, and consequently the threshold voltage level required at the source/drain node 36 to push the MOSCap 20 into the inversion mode, can be controlled. By controlling the MOSCap 20 to enter an inversion mode once the charge accumulated at the source/drain node 36 is at a certain level, the MOSCap 20 is utilized to store charge and prevent saturation and blooming in a high ambient light situation.

The output switch 28 is operated to control the readout of accumulated charge in the unit cell 16 to the column bus 30, and hence the image processing unit 14, for image processing. The reset gate bias control module 32 provides a gate bias voltage signal ($Ø_{BLM/Rst}$) 46 to the gate of the reset switch 22. The gate bias voltage signal ($Ø_{BLM/Rst}$) 46 controls whether the reset switch 22 is opened or closed. While charge is accumulating in the unit cell 16, the gate bias voltage signal ($Ø_{BLM/Rst}$) 46 operates the reset switch 22 to be in an open state. Also while charge is accumulating in the unit cell 16, the output switch is controlled (e.g., by the image processing unit 14) to be in an open state.

When the image processing unit 14 wants to read out the accumulated charge in the unit cell 16 for image processing, the image processing unit 14 operates the output switch to close. Once the output switch is closed (and the reset switch 22 is maintained in an open state), charge accumulated at the source/drain node 36 is read out at the image processing unit 14 via the buffer transistor 26 and the column bus 30 as a high sensitivity signal having a voltage proportional to the charge accumulated at the source/drain node 36 in a low ambient light situation. If the unit cell 16 was exposed to a low ambient light situation, the high sensitivity signal read out by the image processing unit 14 accurately represents the intensity of the light incident on the photodiode 24 from the scene being viewed. However, if the unit cell 16 was exposed to a high ambient light situation, the high sensitivity signal read out by the image processing unit 14 from the source/drain node 36 may not accurately reflect the intensity of the light incident on the photodiode 24 from the scene being viewed as a portion of the charge generated in response to light incident on the photodiode 24 was likely stored on the MOSCap 20.

Accordingly, after reading out the charge accumulated at the source/drain node 36, the reset gate bias control module 32 operates the reset switch 22 to remain open and the output switch 28 remains closed. While the output switch 28 remains closed, the charge accumulated on the MOSCap 20 is read out to the image processing unit 14 via the buffer transistor 26 and the column bus 30 as a low sensitivity signal having a voltage proportional to the charge accumulated on the MOSCap 20 in a high ambient light situation. The low sensitivity signal read out by the image processing unit 14 from the MOSCap 20 accurately represents the intensity of the light incident on the photodiode 24 in the high ambient light situation.

According to one embodiment, when the charge accumulated on the MOSCap 20 is read out by the image processing unit, the MOSCap gate bias control module 38 provides a gate bias voltage signal ($\varnothing_{LG/Rst}$) 44 to the gate of the MOSCap 20 such that the MOSCap 20 is fully inverted and the low sensitivity signal is linear. However, in other embodiments, the low sensitivity signal may contain a non-linear portion.

After the charge accumulated on the MOSCap 20 is read out, the reset gate bias control module 32 operates the reset switch 22 to close. Once the reset switch 22 is closed, the MOSCap 20 is coupled to the reset voltage ($V_{reset}$) 34 and the charge accumulated in the unit cell 16 is discharged. Once the charge accumulated in the unit cell 16 is discharged, the reset gate bias control module 32 operates the reset switch 22 to open and the unit cell 16 may again accumulate charge in proportion to the intensity of light incident on the unit cell 16.

According to one embodiment, the reset gate bias control module 32 is coupled to a clock 48. In one embodiment, the clock 48 is an external clock 48 (i.e., located off of the unit cell 16); however, in other embodiments, the clock 48 may be configured differently. Based on a clock signal received from the clock 48, the reset gate bias control module 32 turns on (i.e., closes) the reset switch 22 to discharge the unit cell 16. According to one embodiment, the clock signal is configured to turn on the reset switch 22 a predefined amount of time after the output switch 28 is closed; however, in other embodiments, the clock signal may be configured differently. The switching of the output switch 28 and the reset switch 22 are coordinated to allow for the generation of both the high sensitivity signal (based on charge accumulated at the source/drain node 36 in a low ambient light situation) and the low sensitivity signal (based on charge accumulated on the MOSCap 20 in a high ambient light situation).

By generating both a low sensitivity signal and a high sensitivity signal, the unit cell 16 is capable of operating in both a low ambient light situation and a high ambient light situation. The image processing unit 14 is configured to gather the low sensitivity signal and the high sensitivity signal from each unit cell 16 in the array 17 of unit cells 16 and determine which signal (i.e., the low or high sensitivity signal) is appropriate to use, for each unit cell 16, in its image processing.

According to one embodiment, the image processing unit 14 enables the unit cells 16 in a first row of the array 17 to provide a low sensitivity signal and a high sensitivity signal (i.e., by closing the output switches 28 of the unit cells 16 in the first row). After receiving a low sensitivity signal and a high sensitivity signal from each unit cell 16 in the first row of the array 17, the image processing unit 14 enables the unit cells 16 in a second row of the array 17 to provide a low sensitivity signal and a high sensitivity signal (i.e., by closing the output switches 28 of the unit cells 16 in the second row). The image processing unit 14 similarly progresses through each row of the array 17 until a low sensitivity signal and a high sensitivity signal are received from each unit cell 16 in the array.

According to another embodiment, the image processing unit 14 is configured to enable each unit cell 16 in the array 17 to first provide a high sensitivity signal (i.e., after the output switch of each unit cell 16 is closed). After receiving the high sensitivity signal from each unit cell 16 in the array 17, the image processing unit 14 is configured to receive the low sensitivity signal from each unit cell 16 in the array 17. According to other embodiments, the image processing unit 14 may be configured to enable the array 17 of unit cells 16 in other appropriate ways.

Upon receiving a low sensitivity signal and a high sensitivity signal from each unit cell 16 in the array 17, the image processing unit 14 determines which signal (i.e., the low or high sensitivity signal) is appropriate to use for each unit cell 16 (i.e., accurately represents the intensity of light incident on the unit cell 16), in its image processing. According to one embodiment, thresholding circuitry in the image processing unit 14 analyzes the high sensitivity signal from a unit cell 16 and determines if the high sensitivity signal is above a high sensitivity signal threshold. If the high sensitivity signal from a unit cell 16 is above the high sensitivity signal threshold, the image processing unit 14 knows to utilize the low sensitivity signal for that unit cell 16.

According to another embodiment, the image processing unit 14 is configured to receive multiple high sensitivity signals from a unit cell 16 and generate a high sensitivity signal curve based on the multiple high sensitivity signals. In a high ambient light situation, the high sensitivity signal (i.e., generated based on charge accumulated at the source/drain node 36 in a low ambient light situation) may be non-linear. Accordingly, by analyzing the slope of the generated high sensitivity signal curve over a period of time, the image processing unit 14 determines whether the low sensitivity or high sensitivity signal should be utilized. For example, if the image processing unit 14 determines that the high sensitivity signal curve is linear, then it utilizes the high sensitivity signals. Alternatively, if the image processing unit 14 determines that the high sensitivity signal curve is non-linear, then it utilizes the low sensitivity signal.

After identifying which signals (i.e., the low sensitivity or the high sensitivity signal) should be utilized for each unit cell 16, the image processing unit utilizes each identified signal from the unit cells 16 to generate a corresponding image of the scene being viewed.

As described above, the gate bias signals 44, 46 provided to the MOSCap 20 and the reset switch 22 are controlled independently by separate modules 38, 32. However, in another embodiment, the gate bias signals 44, 46 provided to the MOSCap 20 and the reset switch 22 are controlled independently with a single module or controller. According to another embodiment, the gate bias signals 44, 46 and the operational state of the output switch 28 are all independently controlled by a single controller (e.g., the image processing unit 14 or another external controller).

By utilizing the MOSCap 20 as both a high-sensitivity anti-blooming gate as well as a low-sensitivity capacitor (i.e., in both low and high ambient light situations), the size of the unit cell 16 is reduced (e.g., to 4 microns and below) as one the two anti-bloom switches of a traditional dual-path hybrid unit cell can be replaced by the single MOSCap 20. In addition, by operating the MOSCap 20 as both a capacitor and an anti-blooming gate, both low sensitivity and high sensitivity signals are generated, allowing the unit cell 16 to generate accurate light intensity signals in both low and high ambient light situations.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A unit cell comprising:
   a photodiode configured to be coupled to a supply voltage;
   a Metal-Oxide-Semiconductor Capacitor (MOSCap) having a first node coupled to the photodiode;
   a reset switch coupled between a second node of the MOSCap and a reset voltage and configured to selectively couple the second node to the reset voltage; and
   a transistor having a first terminal coupled to the first node of the MOSCap;
   wherein, in a first mode of operation of the unit cell, the reset switch is configured in an open state in response to receiving a reset switch gate bias voltage signal at a first level from a reset switch gate bias control module, and charge generated by light incident on the photodiode accumulates at the first node of the MOSCap in response to voltage at the first node being less than a threshold voltage; and
   wherein, in a second mode of operation of the unit cell, the reset switch is configured in the open state in response to receiving the reset switch gate bias voltage signal at the first level from the reset switch gate bias control module, the MOSCap enters an inversion mode in response to the voltage at the first node being greater than the threshold voltage, and the charge generated by the light incident on the photodiode accumulates on the MOSCap in response to the MOSCap entering the inversion mode.

2. The unit cell of claim 1, further comprising:
   an output; and
   an output switch coupled between a second terminal of the transistor and the output and configured to selectively couple the output to the second terminal of the transistor,
   wherein, in a third mode of operation of the unit cell, the output switch is configured to couple the output to the second terminal of the transistor, the reset switch is configured in the open state in response to receiving the reset switch gate bias voltage signal at the first level from the reset switch gate bias control module, and a high sensitivity signal corresponding to the charge accumulated at the first node of the MOSCap is provided to the output.

3. The unit cell of claim 2, wherein in a fourth mode of operation of the unit cell, the output switch is configured to couple the output to the second terminal of the transistor, the reset switch is configured in the open state in response to receiving the reset switch gate bias voltage signal at the first level from the reset switch gate bias control module, and a low sensitivity signal corresponding to the charge accumulated on the MOSCap is provided to the output.

4. The unit cell of claim 3, further comprising a MOSCap gate bias control module coupled to a gate of the MOSCap and configured to provide a MOSCap gate bias voltage signal to the gate of the MOSCap to control a level of the threshold voltage.

5. The unit cell of claim 3, wherein the reset switch is a transistor having a first terminal coupled to the second terminal of the MOSCap and having a second terminal coupled to the reset voltage.

6. The unit cell of claim 5, further comprising the reset switch gate bias control module coupled to the reset switch and configured to provide the reset switch gate bias voltage signal to the reset switch to control an operational state of the reset switch.

7. The unit cell of claim 3, wherein in a fifth mode of operation of the unit cell, the reset switch is configured to couple the second node of the MOSCap to the reset voltage in response to receiving the reset switch gate bias voltage signal at a second level, and the charge accumulated on the MOSCap is discharged.

8. A method for operating a unit cell comprising a photodiode, a Metal-Oxide-Semiconductor Capacitor (MOSCap) having a first node coupled to the photodiode, a reset switch coupled between a second node of the MOSCap and a reset voltage and configured to selectively couple the second node to the reset voltage, a transistor having a first terminal coupled to the first node of the MOSCap, and an output switch coupled between a second terminal of the transistor and an output and configured to selectively couple the output to the second terminal of the transistor, the method comprising:
   receiving, with the reset switch coupled between the second node of the MOSCap and the reset voltage, a reset switch gate bias voltage signal at a first level from a reset switch gate bias control module;
   configuring the reset switch to an open state for a first and a second mode of operation of the unit cell in response to receiving the reset switch gate bias voltage signal at the first level from the reset switch gate bias control module;
   configuring the output switch to an open state for the first and the second modes of operation;
   generating charge in response to light incident on the photodiode;
   storing, in the first mode of operation in response to voltage at the first node being less than a threshold voltage, the charge at the first node of the MOSCap;
   entering, with the MOSCap, an inversion mode in response to the voltage at the first node being greater than the threshold voltage; and
   storing, in the second mode of operation in response to the MOSCap entering the inversion mode, the charge on the MOSCap.

9. The method of claim 8, further comprising:
   configuring the reset switch to the open state for a third mode of operation of the unit cell in response to receiving the reset switch gate bias voltage signal at the first level from the reset switch gate bias control module;
   coupling the output to the second terminal of the transistor with the output switch for the third mode of operation; and
   reading out, in the third mode of operation, the charge stored at the first node of the MOSCap from the output as a high sensitivity signal.

10. The method of claim 9, further comprising:
    configuring the reset switch to the open state for a fourth mode of operation of the unit cell in response to receiving the reset switch gate bias voltage signal at the first level from the reset switch gate bias control module;

coupling the output to the second terminal of the transistor with the output switch for the fourth mode of operation; and reading out, in the fourth mode of operation, the charge stored on the MOSCap from the output as a low sensitivity signal.

11. The method of claim 10, further comprising:
determining which one of the low sensitivity signal and the high sensitivity signal accurately represents an intensity of the light incident on the photodiode; and
utilizing the one of the low sensitivity signal and the high sensitivity signal to generate a pixel of an image.

12. The method of claim 11, wherein determining comprises:
comparing the high sensitivity signal to a high sensitivity signal threshold;
identifying the high sensitivity signal as an accurate representation of the intensity of the light incident on the photodiode in response to a determination that the high sensitivity signal is less than the high sensitivity signal threshold; and
identifying the low sensitivity signal as an accurate representation of the intensity of the light incident on the photodiode in response to a determination that the high sensitivity signal is greater than the high sensitivity signal threshold.

13. The method of claim 11, wherein determining comprises:
recording a plurality of the high sensitivity signals over a period of time;
generating a high sensitivity signal curve based on the plurality of the high sensitivity signals;
analyzing a slope of the high sensitivity signal curve;
identifying the high sensitivity signal as an accurate representation of the intensity of the light incident on the photodiode in response to a determination that the high sensitivity signal curve is linear; and
identifying the low sensitivity signal as an accurate representation of the intensity of the light incident on the photodiode in response to a determination that the high sensitivity signal curve is non-linear.

14. The method of claim 10, further comprising:
coupling, in a fifth mode of operation of the unit cell, the second node of the MOSCap to the reset voltage with the reset switch in response to the reset switch receiving the reset switch gate bias voltage signal at a second level; and
discharging, in the fifth mode of operation, the charge stored on the MOSCap.

15. The method of claim 8, further comprising providing a MOSCap gate bias voltage signal to a gate of the MOSCap to control a level of the threshold voltage.

16. An image sensor comprising:
an image processing unit; and
a plurality of unit cells coupled to the image processing unit and configured in an array, each unit cell comprising:
a photodiode coupled to a supply voltage;
a Metal-Oxide-Semiconductor Capacitor (MOSCap) having a first node coupled to the photodiode;
a reset switch coupled between a second node of the MOSCap and a reset voltage and configured to selectively couple the second node to the reset voltage; and
a transistor having a first terminal coupled to the first node of the MOSCap;

wherein, in a first mode of operation of each unit cell, the reset switch is configured in an open state in response to receiving a reset switch gate bias voltage signal at a first level from a reset switch gate bias control module, and charge generated by light incident on the photodiode accumulates at the first node of the MOSCap in response to voltage at the first node being less than a threshold voltage; and wherein, in a second mode of operation of each unit cell, the reset switch is configured in the open state in response to receiving the reset switch gate bias voltage signal at the first level from the reset switch gate bias control module, the MOSCap enters an inversion mode in response to the voltage at the first node being greater than the threshold voltage, and the charge generated by the light incident on the photodiode accumulates on the MOSCap in response to the MOSCap entering the inversion mode.

17. The image sensor of claim 16, wherein each unit cell further comprises:
a MOSCap gate bias control module coupled to a gate of the MOSCap and configured to provide a MOSCap gate bias voltage signal to the gate of the MOSCap to control a level of the threshold voltage; and
the reset switch gate bias control module coupled to the reset switch and configured to provide the reset switch gate bias voltage signal to the reset switch to control an operational state of the reset switch.

18. The image sensor of claim 17, further comprising an external clock coupled to at least one of the reset switch gate bias control module and the MOSCap gate bias control module.

19. The image sensor of claim 16, wherein each unit cell further comprises:
an output coupled to the image processing unit; and
an output switch coupled between a second terminal of the transistor and the output and configured to selectively couple the output to the second terminal of the transistor, wherein, in a third mode of operation of each unit cell, the output switch is configured to couple the output to the second terminal of the transistor, the reset switch is configured in the open state in response to receiving the reset switch gate bias voltage signal at the first level from the reset switch gate bias control module, and the image processing unit is configured to read out the charge accumulated at the first node of the MOSCap from the output as a high sensitivity signal, wherein in a fourth mode of operation of each unit cell, the output switch is configured to couple the output to the second terminal of the transistor, the reset switch is configured in the open state in response to receiving the reset switch gate bias voltage signal at the first level from the reset switch gate bias control module, and the image processing unit is configured to read out the charge accumulated on the MOSCap from the output as a low sensitivity signal, and wherein in a fifth mode of operation of each unit cell, the reset switch is configured to couple the second node of the MOSCap to the reset voltage in response to receiving the reset switch gate bias voltage signal at a second level, and the charge accumulated on the MOSCap is discharged.

20. The image sensor of claim 19, wherein the image processing unit is configured to receive the high sensitivity signal and the low sensitivity signal from each unit cell, to determine which one of the low sensitivity signal and the high sensitivity signal from each unit cell accurately represents an intensity of the light incident on the photodiode, and to generate an image based on the one of the low sensitivity signal and high sensitivity signal from each unit cell.

\* \* \* \* \*